United States Patent Office

Re. 25,136
Reissued Mar. 13, 1962

25,136

ELECTROSTATIC DEVELOPER COMPOSITION AND METHOD THEREFOR

Chester F. Carlson, Pittsford, N.Y., assignor, by mesne assignments, to Xerox Corporation, a corporation of New York No Drawing. Original No. 2,940,934, dated June 14, 1960, Ser. No. 699,437, Nov. 29, 1957. Application for reissue June 12, 1961, Ser. No. 116,925
14 Claims. (Cl. 252—62.1)

Matter enclosed in heavy brackets [ ] appears in the original patent but forms no part of this reissue specification; matter printed in italics indicates the additions made by reissue.

This invention relates in general to xerography and in particular to a developer composition of improved performance in the art of xerography.

In xerography it is usual to reproduce a master by electrical photography methods such as, most typically, placing an electrostatic charge on a photoconductive surface, selectively dissipating such charge by exposure to an optical image corresponding to the master to be reproduced and developing the resulting electrostatic image by exposure to an electroscopic material. According to one practice in xerography as disclosed in U.S. 2,618,552 to E. N. Wise, the development of the electrostatic image is accomplished by rolling or cascading across the image-bearing surface a developer composition of relatively large carrier particles having on their surfaces and electrostatically coated thereon fine powder particles known as toner particles. As the composition cascades or rolls across the image-bearing surface, these toner particles are electrostatically deposited on and secured to the charged portions of the image and are not deposited on the uncharged or background portions of the image. More than that, toner particles accidentally deposited on these background portions are physically removed therefrom by electrostatic action of the carrier particles passing thereacross whereby these toner particles are electrostatically secured to the rolling carrier particles and are picked up from the surface in this manner. The result is an excellent copy of the electrostatic image in the form of an image by the toner particles electrostatically clinging to the image surface and removable therefrom by any of various means such as adhesive transfer, electrostatic transfer, or the like. Thus the image body may be transferred to a sheet in contact with the image body and applying an electrostatic charge to the paper while in such contact. When the paper is subsequently stripped from the image-bearing surface it carries with it a substantial proportion of the image body to yield a xerographic print which thereafter may be made permanent by any desired method such as heating, solvent fixing or the like.

After the image is transferred from the image surface to the transfer member, or paper, the image surface may be cleaned and then is ready for use in a subsequent xerographic cycle. The xerographic plate, after being properly cleaned following a previous xerographic cycle, is in its original condition and is substantially unimpaired for future use. However, a problem in prior experience has been caused by the fact that cleaning of the xerographic plate between cycles is unexpectedly difficult, due apparently to the strong attraction of the residual toner particles to the plate. This is evidenced in two manners; first, by the stubborn adherence of toner particles as such to the plate with the result that after mechanical cleaning operations substantial amounts of such powder may still remain on the image surface, and, second, by the fact that a film or layer builds up on the plate surface during repeated cycles and eventually requires additional cleaning operations, such as, for example, solvent cleaning or the like.

Either type of residual toner, that is, either toner in its powder form, or toner as a film on the image surface, impairs the subsequent operation of the xerographic plate. Thus, for example, if toner particles remain on the plate, they interfere with the subsequent steps of xerography causing either deletions or background deposition during subsequent steps. Perhaps the more serious trouble, however, is the building up of the film which appears to consist of a gradual accumulation of the toner material on the plate surface, apparently in the form of a smear as the toner particles are mechanically removed therefrom. The presence of this film interferes in many ways. In the first place, this film has different electrical properties from those of the photoconductive layer on the xerographic plate and thus it tends to interfere with the charging or the sensitizing step. It also has mechanical or physical properties differing from those of the photoconductive layer, particularly in that it is substantially more sticky or tacky than the clean plate surface. Beyond this, the toner films appear to be somewhat hydroscopic to the extent that in humid weather it detrimentally affects conductivity under exposure to light and insulating properties in the absence of light, particularly where the relative humidity is greater than about 80%.

It is presently believed that a great deal of the difficulty caused by the building up of this film, and, in fact, by incomplete removal of toner particles from the residual image is a function of a physical or mechanical property of the toner particle in that they tend to be somewhat tacky and apparently adhere to the image surface by mechanical means as well as by electrostatic forces. The problem, moreover, is complicated by the fact that the usual and presently preferred method of transferring the image body from the image surface to the transfer member, such as the paper sheet, preferably is carried out by electrostatic forces, with the result that the mechanical adhesion between toner and image surface cannot be overcome simply by increasing the mechanical transfer force. Beyond this, the difficulties are compounded by the fact that the presently preferred fixing method for permanentizing the xerographic print employs heat fusion to melt the toner particle onto and into the surface of the transfer sheet. Thus, the toner particle must be capable of electrostatic transfer and subsequently must be usable within temperature limits readily tolerated by convenient and economical transfer members such as paper or the like, and the usual methods of lowering melting points generally tend to increase tackiness. A further and occasionally nagging difficulty is the fact that the toner particles must be charged to correct polarity upon mixing with and coating on the surface of the carrier particles so that the toner will be deposited on the image areas by electrostatic attraction and removed from the non-image areas also by electrostatic attraction. At the present time, xerographic photosensitive members are generally charged to positive polarity for sensitization and thus the toner particles must be such that they are charged to negative polarity by mixing with the carrier particles. These and other problems must be solved while achieving the necessary end results of suitability for xerography, including the ability to form an ink-receptive image useful in lithography.

Now in accordance with the present invention there is provided a new and improved xerographic toner composition comprising finely divided pigmented resin particles having a particle size less than about 20 microns and preferably having an average particle size between about 5 and about 10 microns and consisting of a finely divided uniform mixture of pigment in a non-tacky low melting resin consisting substantially of a polymerized styrene or a blend of polymerized styrenes having a melting point of about 257° F. (ball and ring) and being characterized by extreme toughness as measured by non-smearing properties and by being an extremely hard thermoplastic resin. The polymerized styrene is present in the composition in a predominating amount which is defined herein as being at least about ⅔ of the [entire] *resin* composition; optionally mixed or blended with up to about 25% of modifying polymeric material either by mechanically mixing the polymers or by combining the monomers and copolymerizing (which might be considered as a "chemical" mixture). The pigment or dye is present in the toner in a sufficient quantity to cause it to be highly colored whereby it will form a clearly visible image on a transfer member. Thus, for example, in the usual case where a xerographic copy of a document or the like is desired, the pigment will be a black pigment such as carbon black or other minutely divided carbonaceous pigment. Desirably, the pigment is employed in an amount of at least about 5% based on the total weight of the toner body and generally between about 5% and about 10%.

In the preparation of the toner composition according to the present invention the ingredients are thoroughly mixed to form a uniform dispersion of the pigment in the main body and thereafter the body is finely divided to form the desired toner or powder composition. The mixing may be done by various means, including combinations of the steps of blending, mixing, and milling and the presently preferred method includes a step or blending in a rubber mill to assure uniform and fine dispersion of the pigment in the resin.

One particularly important characteristic of the new composition is its easy cleanability from a surface to which it is clinging by relatively high electrostatic forces. This characteristic is due to a property generally similar to low tackiness and now believed to be attritbutable to hardness and toughness of the finely divided material. Thus, when rubbed across a surface or when wiped off a surface, the tough composition does not smear or stick to the surface.

One particularly type of resin composition which has been found to be unusually well suited to the present invention is a polymerized blend of styrene and styrene homologues of the general formula

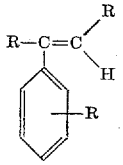

where R is selected from the group consisting of hydrogen and lower alkyl. The resins of this type are prepared in a wide range of average molecular weights from crude mixtures of styrene and styrene homologues such as those obtained from fractionation of the so-called "crude solvent" from "light oils" scrubbed out of coke oven or gas house gas. The resins are pale in color and are non-acid and unsaponifiable. They are substantially wholly hydrocarbon in composition. Polymerization does not advance significantly with age or heat.

A particularly preferred type of resin within this class is a hard, tough resin having a ring and ball melting point of about 125° C. or 257° F. being medium-high in polymer structure. When heated to 150° C. it is quite viscous. A resin of this type, specifically designated in the following examples, is available under the name Piccolastic D–125. It, and its blends with minor amounts of up to ⅓ of a blended resin (wherein the predominating amount, or at least ⅔, is the styrene-type resin thus defined) are hard and tough, highly resistant to ball milling, and melt below the char point of ordinary paper.

The general nature and scope of the invention having been set forth, the following specific embodiments are presented in illustration but not in limitation thereof, and it is to be understood that the invention is to be limited only by the appended claims.

Example 1.—A mixture was prepared comprising 10% by weight of carbon black, 25% by weight polybutyl methacrylate, and 65% by weight of a blend of polymerized styrenes. The blend of polymerized styrenes is available under the name Piccolastic Resin D–125 and is believed to be a mixture of medium-high molecular weight polystyrenes having a ball and ring melting point of 257° F. at room temperature. It is a hard, horny, dry solid, and when heated, can be blended with polybutyl methacrylate to yield a homogeneous mixture.

After melting and preliminary mixing, the composition was fed [to] *into a* rubber mill and thoroughly milled to yield a uniformly dispersed composition of carbon black in the resin body. The resulting mixed composition was thoroughly cooled and then finely subdivided in *a* jet pulverizer to yield a powder composition having an average particle size of about 5 microns. Particle size was moderately uniform with substantially no particles larger than 10 microns and substantially none less than one micron. The resulting powder or toner composition is particularly adapted for use in xerography in combination with vitreous selenium xerographic plates charged to positive polarity for sensitization and exposed to an optical image to yield a positive polarity electrostatic image on the selenium surfaced xerographic plate.

To illustrate the suitability and effectiveness of the material, the powder was deposited on an electrostatic latent image on an image surface by mixing about 1% of the powder in a two component developer as described in Patent Number 2,618,551 and cascading the mixture across an electrostatic image-bearing surface. The image was developed by deposition of the powder on the electrostatic image and the powder was transferred by electrostatic means to a transfer web such as paper whereon it was fused by placing in a heated oven at a temperature of 250° F. for a period of 5 seconds. A residual powder image was cleaned off the image-bearing surface by the method of Patent Number 2,484,782, or by other suitable methods.

The melting point of the resin powder was determined under the conditions of use in xerography, namely by heating the powder composition until it is sufficiently soft to fuse into a single mass and adhere permanently to a web such as a sheet of paper. Its melting point in this manner was 210° F. Under these same heating conditions the paper web is not visibly affected by heat. The residual toner image remaining on the xerographic plate after electrostatic transfer is readily removed by desired methods such as cascading thereacross a cleaning composition as disclosed in Patent 2,484,782 or by brushing the surface with a rapidly rotating fur brush or by like methods. When employed in the xerographic cycle with either of these cleaning operations, the plate was readily cleaned free from detectable residual toner particles and could be recycled for at least 1,000 xerographic cycles without building up significant quantities of film on the surface of the xerographic plate.

When mixed with a carrier composition surfaced with a suitable resin such as is disclosed in Patent Number 2,618,551 the toner prepared according to this example gave clear sharp and extremely black images of satisfactory contrast resolution and appearance. The toner particles when mixed with this carrier composition acquired a negative polarity electrostatic charge whereby they were deposited on a positive polarity electrostatic image and removed by the carrier from uncharged surface areas.

Example 2.—The procedure of Example 1 was repeated employing a mixture of 90% of the same blend of polymerized styrenes and 10% carbon black. In this case the final composition was finely subdivided to yield a powder composition having an average particle size of about 10 microns with substantially none greater than 20 microns. The product was closely comparable in behavior and properties with the product of Example 1, characterized, however, with a slightly lower melting point, namely about 190° F., whereby it melted at a temperature having a greater margin of safety below the char point of paper.

Example 3.—The procedure of Example 1 was repeated employing as the mixture 10% carbon black, 5% polybutyl methacrylate and 85% of the blended polystyrenes. The product had a melting point of about 250° F., and, like the product of Example 1, could be used through at least 1,000 xerographic cycles without building up a coating of film on the xerographic plate.

Example 4.—The procedure of Example 1 was repeated employing as the mixture 10% carbon black, 5% of a polyamide resin sold by E. I. du Pont de Nemours and Company under the trade name "Nylon FM 6501," and 85% of the blended polystyrenes. The product had a melting point of about 250° F. and like the product of Example 1, could be used through many hundred xerographic cycles without building up an objectionable coating of film on the xerographic plate.

Example 5.—The procedure of Example 1 was repeated employing as the mixture 10% carbon black, 5% of a polyethylene resin sold by Union Carbide and Carbon Corp., under the trade name "Vinylite DYLT," and 85% of the blended polystyrenes. The product had a melting point of about 250° F. and like the product of Example 1 could be used through many hundred xerographic cycles without building up an objectionable coating of film on the xerographic plate.

Example 6.—The procedure of Example 1 was repeated employing as the mixture 10% carbon black, 10% of a polyvinyl butyral sold by the Union Carbide and Carbon Corp. under the trade name "Vinylite XYHL," and 80% of the blended polystyrenes. The product had a fusing point of about 245° F., and like the product of Example 1 could be used through at least 1,000 xerographic cycles without building up an objectionable coating of film on the xerographic plate.

Example 7.—The procedure of Example 1 was repeated employing as the mixture 10% carbon black, 10% of a copolymer of butadiene and styrene sold under the name "GR–S 1500," and 80% of the blended polystyrenes. The product had a fusing point of about 260° F., and like the product of Example 1 could be used through at least 1,000 xerographic cycles without building up an objectionable coating of film on the xerographic plate.

Example 8.—The procedure of Example 1 was repeated employing as the mixture 10% carbon black, 25% polystyrene and 75% of the blended polystyrenes. The product had a fusing point of about 270° F. and like the product of Example 1 could be used through at least 1,000 xerographic cycles without building up an objectionable coating of film on the xerographic plate.

Example 9.—The procedure of Example 1 was repeated employing as the mixture 10% carbon black, 25% of a polyvinyl acetal obtained from the Shawinigan Products Corporation under the trade name "Alvar 7–70," and 65% of the blended polystyrenes. The product had a fusing point of about 270° F., and like the product of Example 1, could be used through at least 1,000 xerographic cycles without building up an objectionable coating of film on the xerographic plate.

Example 10.—The procedure of Example 1 was repeated employing as the mixture 10% carbon black, 25% of a copolymer of vinyl chloride and vinyl acetate obtained from the Union Carbide and Carbon Corp. under the trade name "Vinylite VYHH–1," and 65% of the blended polystyrenes. The product had a fusing point of about 225° F., and like the product of Example 1 could be used through at least 1,000 xerographic cycles without building up an objectionable coating of film on the xerographic plate.

Example 11.—The procedure of Example 1 was repeated employing as the mixture 80% of a hydrocarbon resin obtained from the Velsicol Corporation under the trade name "Velsicol AD–6–3," and 20% polystyrene. The toner so prepared was mixed with xerographic carrier particles used to develop electrostatic images on a xerographic selenium plate as described in Example 1. The resulting powder image was transferred to a paper support sheet using electrostatic transfer as described in U.S. 2,576,047 to R. M. Schaffert, and fixed thereto by heating. The residual toner remaining on the selenium surface was removed by rubbing the surface with a cotton swab. After 20 such cycles a film had built up on the surface of the selenium plate of such thickness and density as to completely obscure the surface of the plate. No image whatsoever could be developed on this plate after the 20 cycles due to the heavy film. The process was then repeated using as the toner the composition of Example 1. After some 500 cycles a slight film had built up on the selenium surface of the xerographic plate. The selenium was still perfectly visible and the plate was still producing excellent quality images. Accordingly, the toner of Example 1 was further tested on an automatic machine using a cylindrical drum coated with selenium as the xerographic plate. The drum was cleaned by means of rubbing with a rapidly rotating rabbit's fur brush. The apparatus was run continuously for 24 hours. At the end of that time, although the machine was still producing perfectly legible copy, the machine was stopped and the selenium surface inspected. A detectable film was noticeable on the drum but despite the heavy rubbing the selenium surface was perfectly visible. In this 24-hour period, the drum had gone through over 7000 revolutions.

The novel toner compositions of the instant invention have exceptional utility in developing electrostatic images. In the normal xerographic process such images are created and developed on the surface of a photoconductive insulating member which is generally amorphous selenium. Other photoconductive insulating materials include photoconductive pigments as zinc oxide, zinc-cadmium sulfide, tetragonal lead monoxide, titanium dioxide, etc., in an insulating resin binder. Such materials may also be used as the photoconductive insulating layer.

In addition, rather than developing the electrostatic image on the photoconductive insulating layer, if desired, the electrostatic image pattern may be transferred to an electrically insulating film as polyethylene terephthalate. This process is described more fully in U.S. patent application Serial No. 434,491, filed on June 4, 1954, now U.S. Patent No. 2,825,814 by L. E. Walkup. The toner composition of the instant invention may then be used to develop the electrostatic image on this insulating film to form a powder image corresponding to the electrostatic image thereon. The resulting powder image may then be either permanently affixed to the insulating film or transferred to a support member as paper, metal, plastic, etc., and the insulating film cleaned and reused in the process.

As used in developing electrostatic images the toner composition is loosely coated on a carrier surface to which it remains loosely affixed by reason of electrostatic attraction thereto. The most widely used method of carrier development is known as cascade carrier development as more fully described in U.S. 2,618,551, to L. E. Walkup; U.S. 2,618,552, to E. N. Wise; and U.S. 2,638,416, to Walkup and Wise. In this process the electroscopic toner is desirably mixed with a granular carrier, either electrically conducting or insulating, magnetic or nonmagnetic, provided that the particles of granular material when brought in close contact with the powder particles acquire a charge having an opposite polarity to that of the powder particles adhere to and surround the granular carrier particles. If a positive reproduction of the electrostatic image is desired, the carrier is selected so that the toner particles acquire a charge having the opposite polarity to that of the electrostatic image. Alternatively, if a reversal reproduction of the electrostatic image is desired the carrier is selected so that the toner particles acquire a charge having the same polarity as that of the electrostatic image. Thus, the materials for the granular material are selected in accordance with their triboelectric properties in respect to the electroscopic toner so that when mixed or brought into mutual contact one material is charged positively if the other is below it in a triboelectric series, and negatively if the other material is above it in a triboelectric series. By selecting materials in accordance with their triboelectric effects, the polarities of their charge when mixed are such that the electroscopic toner particles adhere to and are coated on the granular carrier particles and also adhere to the electrostatic image on the plate which thus retains the electroscopic toner in the charge areas that have a greater attraction for the toner than the granular carrier particles have.

The granular carrier particles are grossly larger than the toner particles by at least one order of magnitude of size, and are shaped to roll across the image-bearing surface. Generally speaking, the carrier particles should be of sufficient size so that their gravitation or momentum force is greater than the force of attraction of the toner in the charged areas where the toner is retained on the plate in order that the granular carrier particles will not be retained by the toner particles, while, at the same time, the toner particles are attracted and held, or repelled, as the case may be, by the charged or uncharged areas of the plate since they acquire a charge of opposite polarity to the charge of both the granular carrier particles and the plate. It has been found best to use granular carrier particles of a size larger than about 200 mesh, usually between about 20 and about 100 mesh, and toner particles of a size from about 1 to 20 microns. The granular carrier particles may, if desired, be somewhat larger or smaller as long as the proper size relationship to the electroscopic toner is maintained so that the granular carrier particles will flow easily over the image surface by gravity when the plate is inclined without requiring additional means or measures to remove them.

The degree of contrast or other photographic qualities in the finished image may be varied by changing the ratio of granular carrier to electroscopic material. Successful results have been had with from about 10 to about 200 parts by weight of granular carrier particles capable of being passed through a 30 mesh screen and being collected on a 60 mesh screen to 1 part of the electroscopic toner having a particle size of 1 to 20 microns. Generally speaking, carrier-to-toner ratios in the order of about 100 to 1 prove satisfactory and preferred compositions run from about 70 to 1 to about 150 to 1. In such preferred compositions the carrier acts effectively to remove any toner particles which might tend to adhere to a non-image area and the toner itself forms a dense readily transferable and fusible image.

In addition to the use of granular particles to provide the carrier surface, the bristles of a fur brush may also be used. Here also, the toner particles acquire an electrostatic charge of polarity determined by the relative position of the toner particles and the fur fibers in the triboelectric series. The toner particles form a coating on the bristles of the fur clinging thereto by reason of the electrostatic attraction between the toner and the fur just as the toner clings to the surface of the granular carrier particles. The general process of fur brush development is described in greater detail in U.S. patent application, Ser. No. 401,811, filed by L. E. Walkup on January 4, 1954.

Even more closely related to the cascade carrier development is magnetic brush development. In this process a granular carrier is selected having ferromagnetic properties and selected relative to the toner in a triboelectric series so as to impart the desired electrostatic polarity to the toner and carrier as in cascade carrier development. On inserting a magnet into such a mixture of toner and magnetic granular material the carrier particles align themselves along the lines of force of the magnet to assume a brush-like array. The toner particles are electrostatically coated on the surface of the granular powder carrier particles. Development proceeds as in regular cascade carrier development on moving the magnet over the surface bearing the electrostatic image so that the "bristles" of the magnetic brush contact the electrostatic image-bearing surface.

Still another method of carrier development is known as sheet carrier development in which the toner particles are placed on a sheet or pellicle as of paper, plastic, or metal. This process is described in U.S. patent application Ser. No. 399,293, filed by C. R. Mayo on December 21, 1953, *now U.S. Patent No. 2,895,847.* As described therein the electrostatic attraction between the sheet surface and toner particles necessary to assure electrostatic attraction therebetween may be obtained by leading the sheet through a mass of the electroscopic toner particles whereby there is obtained a rubbing or sliding contact between the sheet and the toner. In general it is desirable to spray the surface of the sheet bearing the electroscopic toner particles with ions of the desired polarity as by the use of a corona charging device as described in the application of Mayo. In any event, as used in developing an electrostatic image the toner composition of the instant invention is electrostatically coated on a suitable carrier surface which is then in turn contacted with the surface bearing the electrostatic image whereby the electroscopic toner particles are transferred to the surface bearing the electrostatic image to form thereon a powder image corresponding to the electrostatic image.

This application is a continuation-in-part of my copending application S.N. 363,381, filed June 22, 1953, and now abandoned.

I claim:

1. An improved xerographic developer comprising a mixture of finely-divided xerographic toner particles electrostatically coated on carrier particles, the carrier particles being shaped to roll across a surface and at least about 200 mesh and having removably coated thereon by electrostatic attraction toner powder particles having a particle size on the average less than about 20 microns, said toner powder particles consisting essentially of from about 5 to about 10 percent pigment and *about* 95 to *about* 90 percent resin containing at least *about* two-thirds polystyrene based on the total weight of the [toner] *resin,* the finely-divided toner being hard and tough and being thereby adapted to be easily cleaned by brushing from an insulating surface.

2. An improved xerographic developer comprising a mixture of finely-divided xerographic toner particles electrostatically coated on carrier particles, the carrier particles being shaped to roll across a surface and at least about 200 mesh and having removably coated thereon by electrostatic attraction toner powder particles having a particle size on the average less than about 120 microns, said toner powder particles consisting essentially of from about 5 to about 10 percent pigment and *about* 95 to *about* 90 percent resin containing at least *about* two-thirds based on the total weight of the [toner] *resin* of a polymerized blend of monomers of styrene and styrene homologs of the formula

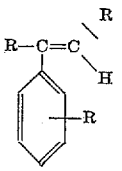

where R is selected from the group consisting of hydrogen and lower alkyl, the polymerized blend of styrene monomers having a ring and ball melting point of about 125° C., the toner particles being hard and tough and being thereby adapted to be easily cleaned, by brushing, from an insulating surface.

3. An improved xerographic developer comprising a mixture of finely-divided xerographic toner particles electrostatically coated on carrier particles, the carrier particles being shaped to roll across a surface and at least about 200 mesh and having removably coated thereon by electrostatic attraction toner powder particles having a particle size on the average less than about 20 microns, said toner powder particles consisting essentially of from about 5 to about 10 percent pigment in a polystyrene resin having a ring and ball melting point of about 125° C.

4. An improved xerographic developer comprising a mixture of finely-divided xerographic toner particles electrostatically coated on carrier particles, the carrier particles being shaped to roll across a surface and at least about 200 mesh and having removably coated thereon by electrostatic attraction toner powder particles having a particle size on the average less than about 20 microns, said toner powder particles consisting essentially of from about 5 to about 10 percent pigment in a polymerized blend of monomers of styrene and styrene homologues of the formula

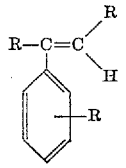

where R is selected from the group consisting of hydrogen and lower alkyl, the polymerized blend of styrene monomers having a ring and ball melting point of about 125° C., the toner particles being hard and tough and being thereby adapted to be easily cleaned, by brushing, from an insulating surface.

5. An improved xerographic developer comprising finely-divided powder particles uniformly electrostatically coated on a carrier surface capable of retaining said powder particles by electrostatic attraction, the carrier surface being adapted to make firm contact with a surface bearing an electrostatic image and having removably coated thereon by electrostatic attraction xerographic toner particles having a particle size on the average less than about 20 microns, said toner powder particles consisting essentially of from about 5 to about 10 percent pigment and *about* 95 to *about* 90 percent resin [containing at least two-thirds] *being a predominantly* polystyrene *resin polymerized from at least about two-thirds styrene* based on the total weight of the [toner] *resin,* a finely-divided toner being hard and tough and being thereby adapted to be easily cleaned, by brushing, from an insulating surface.

6. An improved xerographic developer comprising finely-divided powder particles uniformly electrostatically coated on a carrier surface capable of retaining said powder particles by electrostatic attraction, the carrier surface being adapted to make firm contact with a surface bearing an electrostatic image and having removably coated thereon by electrostatic attraction xerographic toner particles having a particle size on the average less than about 20 microns, said toner powder particles consisting essentially of from about 5 to about 10 percent pigment and *about* 95 to *about* 90 percent resin containing at least *about* two-thirds based on the total weight of the [toner] *resin* of a polymerized blend of monomers of styrene and styrene homologues of the formula

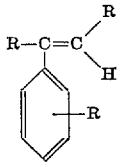

where R is selected from the group consisting of hydrogen and lower alkyl, the polymerized blend of styrene monomers having a ring and ball melting point of about 125° C., the toner particles being hard and tough and being thereby adapted to be easily cleaned, by brushing, from an insulating surface.

7. An improved xerographic developer comprising finely-divided powder particles uniformly electrostatically coated on a carrier surface capable of retaining said powder particles by electrostatic attraction, the carrier surface being adapted to make firm contact with a surface bearing an electrostatic image and having removably coated thereon by electrostatic attraction xerographic toner particles having a particle size on the average less than about 20 microns, said toner powder particles consisting essentially of from about 5 to about 10 percent pigment in a polystyrene resin having a ring and ball melting point of about 125° C.

8. An improved xerographic developer comprising finely-divided powder particles uniformly electrostatically coated on a carrier surface capable of retaining said powder particles by electrostatic attraction, the carrier surface being adapted to make firm contact with a surface bearing an electrostatic image and having removably coated thereon by electrostatic attraction xerographic toner particles having a particle size on the average less than about 20 microns, said toner powder particles consisting essentially of from about 5 to about 10 percent pigment in a polymerized blend of monomers of styrene and styrene homologs of the formula

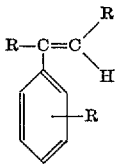

where R is selected from the group consisting of hydrogen and lower alkyl, the polymerized blend of styrene monomers having a ring and ball melting point of about 125° C., the toner particles being hard and tough and being thereby adapted to be easily cleaned, by brushing, from an insulating surface.

9. A process of xerography wherein an electrostatic image is made visible comprising contacting an image surface bearing an electrostatic image thereon with a finely-divided pigmented resin *toner* consisting essentially of between about 5 and about 10 percent pigment and *about* 95 to *about* 90 percent resin [containing at least two-thirds] *being a predominantly* polystyrene *resin polymerized from at least about two-thirds styrene* based on the total weight of the [toner] *resin,* [a] *the* finely-divided toner being hard and tough and being thereby adapted to be easily cleaned, by brushing, from an insulating surface.

10. A process of xerography wherein an electrostatic image is made visible comprising contacting an image surface bearing an electrostatic image thereon with a finely-divided pigmented resin *toner* consisting essentially of between about 5 and about 10 percent pigment and *about* 95 to *about* 90 percent resin containing at least two-thirds based on the total weight of the [toner] *resin* of a polymerized blend of monomers of styrene and styrene homologs of the formula

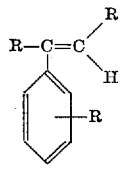

where R is selected from the group consisting of hydrogen and lower alkyl, the polymerized blend of styrene monomers having a ring and ball melting point of about 125° C., the toner particles being hard and tough and being thereby adapted to be easily cleaned, by brushing, from an insulating surface.

11. A process of xerography wherein an electrostatic image is made visible comprising contacting an image surface bearing an electrostatic image thereon with a finely-divided pigmented resin consisting essentially of between about 5 and about 10 percent pigment in a polystyrene resin having a ring and ball melting point of about 125° C.

12. A process of xerography wherein an electrostatic image is made visible comprising contacting an image surface bearing an electrostatic image thereon with a finely-divided pigmented resin *toner* consisting essentially of between about 5 and about 10 percent pigment in a polymerized blend of monomers of styrene and styrene homologs of the formula

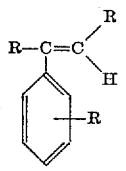

where R is selected from the group consisting of hydrogen and lower alkyl, the polymerized blend of styrene monomers having a ring and a ball melting point of about 125° C., the toner particles being hard and tough and being thereby adapted to be easily cleaned, by brushing, from an insulating surface.

*13. An improved xerographic developer comprising finely-divided powder particles uniformly electrostatically coated on a carrier surface capable of retaining said powder particles by electrostatic attraction, the carrier surface being adapted to make firm contact with a surface bearing an electrostatic image and having removably coated thereon by electrostatic attraction xerographic toner particles having a particle size on the average less than about 20 microns, said toner powder particles consisting essentially of about 10% pigment, and there being sufficient pigment in said toner to cause said toner to be highly colored whereby it will form a clearly visible developed image, and about 90% resin, said resin being a predominantly polystyrene resin polymerized from at least about two-thirds styrene based on the total weight of the resin, the finely-divided toner being hard and tough and being thereby adapted to be easily cleaned, by brushing, from an insulating surface.*

*14. A process of xerography wherein an electrostatic image is made visible comprising contacting an image surface bearing an electrostatic image thereon with a finely-divided pigmented resin toner consisting essentially of about 10% pigment, and there being sufficient pigment in said toner to cause said toner to be highly colored whereby it will form a clearly visible developed image, and about 90% resin, said resin being a predominantly polystyrene resin polymerized from at least about two-thirds styrene based on the total weight of the resin, the finely-divided toner being hard and tough and being thereby adapted to be easily cleaned, by brushing, from an insulating surface.*

References Cited in the file of this patent or the original patent

UNITED STATES PATENTS 2,788,288 Rheinfranck et al. -------- Apr. 9, 1957